Figure 1:
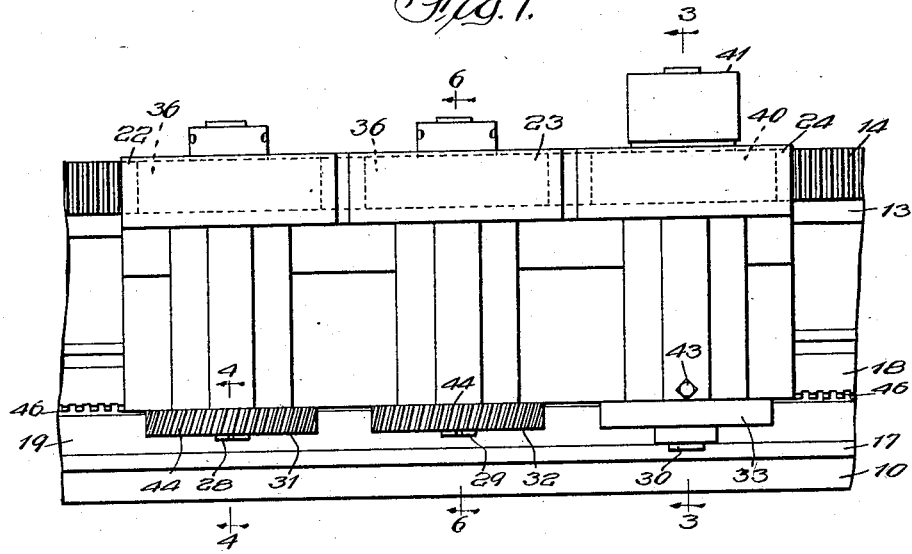

April 12, 1932.  G. E. PURPLE  1,853,928
BELT FASTENER APPLYING MACHINE
Filed Aug. 8, 1930   3 Sheets-Sheet 1

Witness:
William P. Kilroy

Inventor
George E. Purple
By Joseph Harris
His Atty

April 12, 1932.  G. E. PURPLE  1,853,928
BELT FASTENER APPLYING MACHINE
Filed Aug. 8, 1930   3 Sheets-Sheet 2
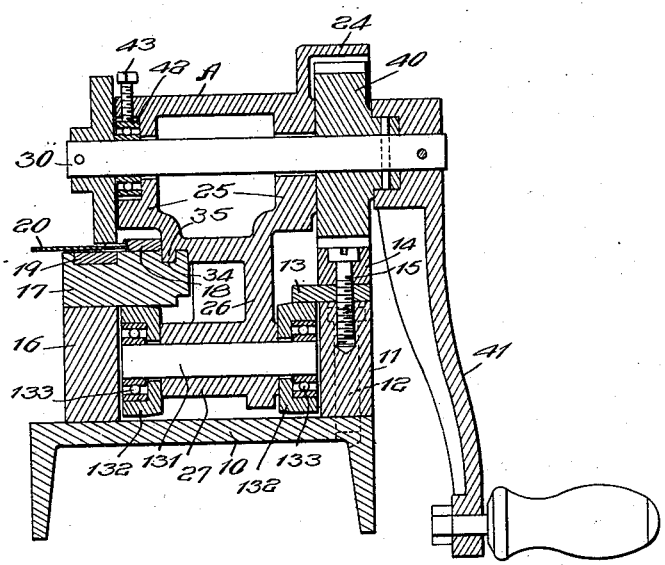
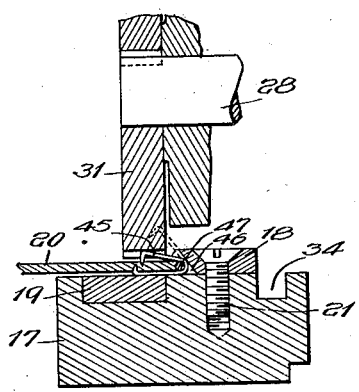 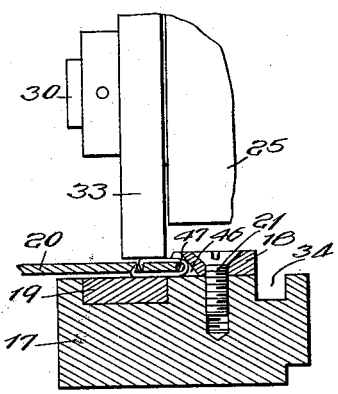
Witness:
William P. Kilroy
Inventor:
George E. Purple
Joseph Harris
His Atty.

April 12, 1932.　　　　G. E. PURPLE　　　　1,853,928
BELT FASTENER APPLYING MACHINE
Filed Aug. 8, 1930　　　3 Sheets-Sheet 3
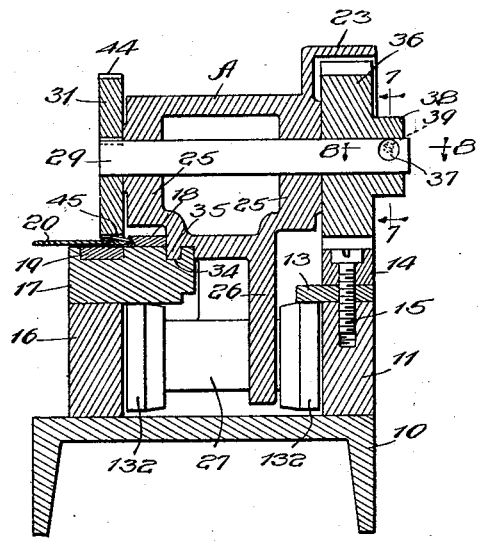
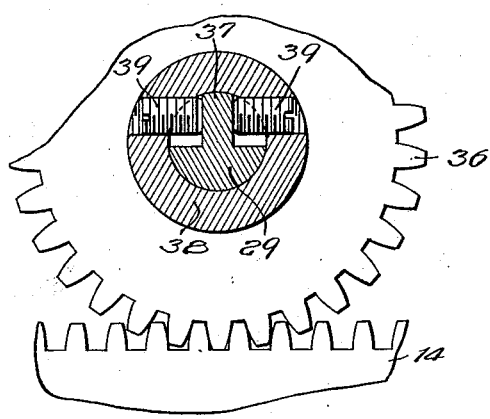
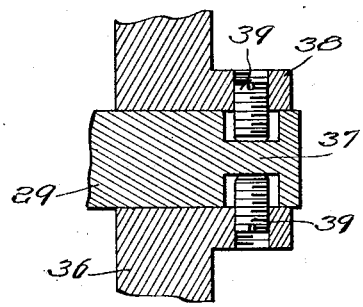
Inventor:
George E. Purple
Joseph Harris
His Atty.
Witness:
William P. Kilroy Patented Apr. 12, 1932

1,853,928

UNITED STATES PATENT OFFICE

GEORGE E. PURPLE, OF LA GRANGE, ILLINOIS, ASSIGNOR TO FLEXIBLE STEEL LACING COMPANY, OF CHICAGO, ILLINOIS, A CORPORATION OF ILLINOIS

BELT FASTENER APPLYING MACHINE

Application filed August 3, 1930. Serial No. 473,833.

This invention relates to belt fastener applying machines and is in the nature of an improvement on the machine disclosed in my prior Patent 1,740,959, issued December 24, 1929.

As in the former patent, the present machine is designed primarily for applying belt lacings, hooks or fastener means to wide belts or aprons, such as commonly used in laundry ironers or the like, although adapted for other similar uses, as will be understood by those skilled in the art. In the machine of said patent, the fastener means are inserted in a holder or rack and the edge of the belt inserted within the prongs of the fastener means. A carriage having two plane surface rollers set progressively relatively to the fastener means, is then moved lengthwise of the fastener means at the belt edge so that pressure is progressively applied by the rollers to imbed in and clinch the fastener means to the belt end. In actual practice, it has been found that, due to the application of pressure on the rollers simultaneously with the bodily advancement of the rollers along the row or length of the fastener means, there is a constant tendency to displace or push the prongs of the fastener means out of proper alinement, with the result that application of the fastener means is uneven and unsatisfactory. Further, with said patented machine, due to the use of all smooth or plane surface pressure rollers, a preliminary or initial imbedding of the prongs into the belt end by hammering is necessary in order to obtain smooth flattening down of the prongs. Such preliminary hammering of the prongs obviously requires additional time and labor.

Objects of my present invention, therefore, are to provide a machine for applying belt fastener means of the general type disclosed in said prior Patent 1,740,959 but which will eliminate the necessity of any preliminary hammering down of the prongs and also any undesirable displacement or disalinement of the prongs during the application of the roller pressure to the end that the operation of attaching the fastener means may be carried out more quickly, at less cost and with a more efficient result.

More specifically, an object of my invention is to provide, in the type of machine indicated, an arrangement and construction of pressure rollers such that the advance roller or rollers will, in timed relation, individually engage the prongs of the fastener means and accurately and positively guide the same to proper position and either set or imbed the same in the belt end with an assured proper final clinching.

Other objects of my invention will more clearly appear from the description and claims hereinafter following.

Figure 2:
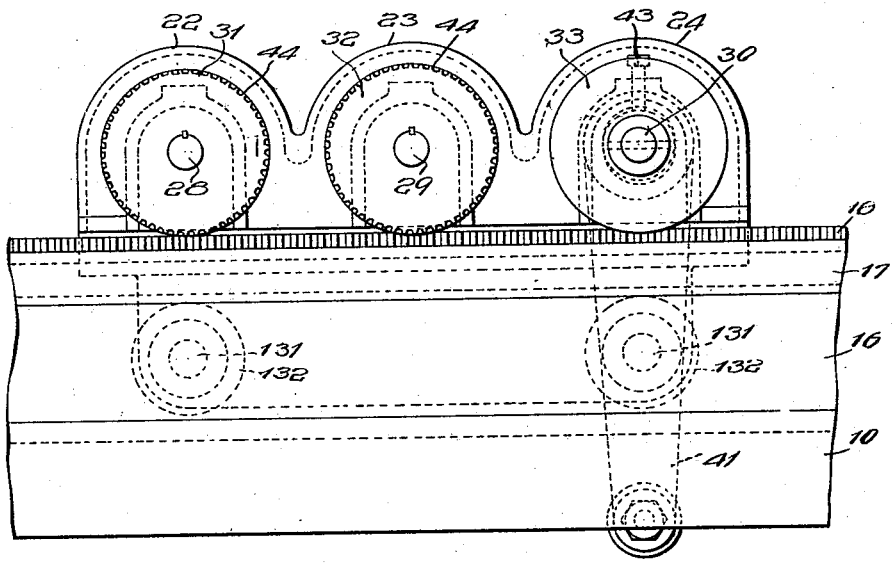

In the drawings forming a part of this specification, Figure 1 is a top plan view of a machine embodying my improvements, parts being broken away in order to accommodate the figure on the sheet. Figure 2 is a front elevational view of the machine shown in Figure 1 and similarly broken away. Figure 3 is a vertical transverse sectional view corresponding to the line 3—3 of Figure 1. Figure 4 is an enlarged vertical sectional view corresponding approximately to the line 4—4 of Figure 1 and showing more particularly the first pressure roller. In this figure is also indicated in dotted lines, the original position assumed by the belt fastener means. Figure 5 is a view similar to Figure 4 but illustrating the last pressure roller. Figure 6 is a transverse vertical sectional view corresponding to the line 6—6 of Figure 1. Fig. 7 is an enlarged detail view corresponding to the line 7—7 of Figure 6. And Figure 8 is a detail sectional view corresponding to the line 8—8 of Figure 6.

In said drawings, the main support or bed plate of the machine is indicated at 10, the same preferably being in the form of an inverted heavy channel, and which may be of any desired length, corresponding to the maximum width of belt or apron to be laced. In this connection, it will be understood that the term "belt", as hereinafter employed, is used in a generic sense to include not only belts of leather but belts or aprons of fabric or other material. Mounted on the bed plate 10 is a rear rack supporting plate 11, secured in place by suitable bolts 12. On top of the plate 11 is an overhanging guide plate 13 for a purpose hereinafter specified and on top of the latter is a rack 14, which extends the length of the machine, said rack 14 and plate 13 being secured by a plurality of bolts 15 at suitable intervals therealong.

Along the front edge of the bed plate 10 extends a heavy plate 16 to which is secured an inwardly overhanging guide plate 17, and on the top of the latter is secured the belt fastener means holder 18, said plates 16 and 17 and holder 18 extending the full length of the machine, as will be understood. Also inserted in the top face of the plate 17 is a preferably case hardened anvil plate 19 against which the lacings or fasteners are clinched, as will be understood. With this construction, as clear from the drawings, a horizontal table or support is provided not only for the lacings or fasteners but for the belt end 20. As will be further understood, the holder 18 is detachably or removably secured in position by countersunk screws 21 so that different holders may be used with the same apparatus. Bodily movable lengthwise of the machine is a carriage, the main casting of which is indicated by the reference character A. Said carriage is relatively elongated and is formed with three generally semi-circular housings 22, 23 and 24 along the rear side and also with web sections 25—25 providing three sets of bearings for the pinions and pressure rollers, hereinafter described. The carriage casting A is further provided with depending web sections 26, with which are cast integrally two journal bearings 27 for the guide rollers hereinafter described. Journaled in the three sets of upper journal bearings are three shafts 28, 29 and 30, respectively. To the front or outer ends of these shafts are keyed or otherwise secured three pressure rollers 31, 32 and 33, respectively, said rollers being so positioned, as shown in Figure 2, that their effective bearing surfaces are progressively downwardly set from left to right so as to effect a progressive setting and clinching of the fastener means, as hereinafter explained.

Journaled in the two lower bearing sections 27—27, which are preferably located under the first and last pressure rollers 31 and 33, respectively, are two shafts 131—131, each of which carries at its front and rear ends a guide roller 132—132, the latter being preferably, in turn, mounted on the shafts 131 by anti-friction ball bearings 133—133, as best shown in Figure 3. The guide rollers 132 engage under the guide plates 13 and 17, and obviously prevent the carriage A from lifting up and consequently the exertion of pressure on the fastener means by the pressure rollers. The front guide plate 17 is also preferably provided with a longitudinally extending groove 34 in which works a corresponding guide flange 35 formed on the carriage casting, so as to maintain the true path of longitudinal travel of the carriage in its movements back and forth on the machine.

Secured to the rear or inner ends of the two advance shafts 28 and 29 are pinions 36—36. The details of the connection to the respective shafts is shown best in Figures 6, 7 and 8. As there shown, each shaft is cut away at its inner end so as to provide a flange section 37 within the hub portion 38 of the pinion.

Each hub portion 38 carries two set screws 39—39 cooperable with the flange section 37 so that the pinion can be adjusted angularly with respect to the shaft, which in turn provides for the angular adjustment between the pinions and the respective pressure rollers 31 and 32 at the other ends of the shafts, for the purpose hereinafter described. The third shaft 30 carries at its rear end another pinion 40, which may be keyed or pinned as shown in Figure 3 and said shaft 30 also carries an operating handle 41. As will be understood, all pinions 36 and 40 cooperate with the rack 14 so that, upon rotation of the handle 41, positive movement longitudinally of the machine is imparted to the carriage and all three pressure rollers are simultaneously and positively rotated. In the case of the last or final pressure roller 33, the front end of its shaft 30 is preferably adjustable vertically in an anti-friction ball bearing 42, by means of a set screw 43, so that the distance between the active plane surface of the roller 33 and the anvil plate 19 can be accurately gauged and adjusted.

The two advance pressure rollers 31 and 32 are of like construction, each being preferably splined to its corresponding shaft. Each of said rollers has its periphery provided with a series of teeth 44—44, which are inclined from upper left downwardly to lower right, as viewed in top plan and as shown in Figure 1. As will be understood, the teeth on the underside of said pressure rollers where the same engage with the prongs 45 of the fastener means, as shown best in Figures 4 and 6, will have the teeth all sloping in the opposite direction. Said teeth 44 are of a pitch or are so spaced as to correspond accurately with the spacing of the prongs 45 of the fastener means, whether the latter be of the continuous belt lacing type or the individual hook type. As previously described, the angular adjustment provided for between the pressure rollers 31 and 32 and their respective pinions 36 permits of the accurate adjustment of the teeth 44, with the notches 46 of the holder 18 that carries and positions the fastener means 45, the latter being held in place by a gauge pin 47, as will be understood. In this way, it will be seen that the teeth 44 of the first and second rollers are accurately adjusted so that each prong of the fastener means will be straddled by or engaged between two adjacent teeth of the respective pressure rollers and thereby positively and accurately maintained in proper position without danger of the prongs being pushed or offset in a direction corresponding to the bodily movement of the carriage and pressure rollers. By sloping the teeth 44 in the manner indicated, the prongs are, in fact, displaced slightly in a reverse direction to the direction of movement of the carriage so as to preserve the proper alinement of the prongs and thereby compensate for the shift of the prongs which might otherwise occur, due to the bodily movement of the pressure rollers simultaneously with the depressing or imbedding of the fastener prongs. By progressively setting the pressure rollers as hereinbefore stated, the first roller 31 will serve to initially imbed the prongs in the belt; the second pressure roller 32 will continue the deformation and imbedding and the final pressure roller 33 with the plane surface, after the prongs have been sufficiently set so that displacement can no longer occur, will complete the imbedding and ultimate clinching over of the prongs.

From the preceding description, taken in connection with the drawings, it will be seen that no preliminary hammering down of the fastener means is necessary but, on the contrary, the fastener means may be inserted and held in the holder, the end of the belt inserted between the prongs and then the carriage reciprocated and a complete clinching obtained from the three rollers. Further, the use of toothed pressure rollers insures the maintenance of proper alinement of the prongs, thereby eliminating any tendency of the fastener means to buckle or creep with respect to the end of the belt and a final smooth and neat application obtained.

As will be understood by those skilled in the art, the toothed pressure rollers 31 and 32 may be interchanged for others of different pitch, corresponding to the spacing of the notches 46 of the holder 18, if different size fastener means are employed.

Although I have herein shown and described what I now consider the preferred manner of carrying out my invention, the same is merely illustrative and I contemplate all such changes and modifications as come within the scope of the claims appended hereto.

I claim:

1. In a machine of the character described, the combination with a frame; of means thereon for holding a length of pronged belt fastener means in position to receive the end of a belt inserted within the prongs; a carrier mounted on said frame to reciprocate lengthwise of said holding means; and a plurality of rollers on said carriage successively engageable with the fastener means as the carriage is reciprocated, the advance roller having its periphery formed to individually straddle the prongs.

2. In a machine of the character described, the combination with a frame; of means thereon for holding a length of pronged belt fastener means in position to receive the end of a belt inserted within the prongs; a carrier mounted on said frame to reciprocate lengthwise of said holding means; and an advance toothed pressure roller on said carriage having the teeth thereof engageable between the prongs; and a rear plane surface pressure roller on said carriage for effecting final clinching of the prongs.

3. In a machine of the character described, the combination with a supporting frame; of means thereon for holding a length of pronged belt fastener means in position to receive the end of a belt within the prongs; prong-setting and space-retaining means mounted on said frame and movable lengthwise of said holding means and individually and selectively engageable with the prongs; and additional means for further setting and clinching the prongs also mounted on said frame and movable lengthwise of said holding means.

4. In a machine of the character described, the combination with a frame; of means thereon for holding a length of pronged belt fastener means in position to receive the end of a belt inserted within the prongs; a pressure roller mounted to reciprocate lengthwise of said holding means and having a notched periphery to selectively straddle the prongs and initially set the same in the belt end; and an additional pressure roller also mounted to reciprocate lengthwise of said holding means to further set the prongs.

5. In a machine of the character described, the combination with a frame; of means thereon for holding a length of pronged belt fastener means in position to receive the end of a belt inserted within the prongs; two progressively set pressure rollers, each mounted to reciprocate lengthwise of said holding means and having notched peripheries to individually straddle the prongs and progressively set the same; and a final pressure roller also reciprocally mounted.

6. In a machine of the character described, the combination with a frame; of a holder thereon for belt fastener means with prongs uniformly spaced; means for setting the prongs into a belt end including a roller having a periphery notched to correspond with the spacing of the prongs; a reciprocally mounted carriage for supporting said roller; means for positively reciprocating said carriage including a rack and pinion; and means for angularly adjusting said pressure roller with reference to the rack whereby to bring the notches in timed relation to the prongs.

7. In a machine of the character described, the combination with a frame; of a holder thereon for retaining belt fastener means with prongs uniformly spaced; means for setting said prongs including a pressure roller having notches in the periphery thereof to receive the prongs; a shaft to which said roller is fixed; a pinion at the opposite end of said shaft; a rack with which said pinion cooperates; and means for angularly adjusting the pressure roller and pinion whereby to accurately position the notches of the pressure roller with reference to the prongs.

8. In a machine of the character described, the combination with a frame; of a holder thereon for retaining belt fastener means with prongs uniformly spaced; a carriage mounted for longitudinal movement with reference to said holder; a plurality of pressure rollers mounted in said carriage and adapted to successively engage the fastener means, certain of said rollers having notched peripheral surfaces to receive the prongs; and means for imparting positive rotation to said notched pressure rollers including a fixed rack, a pinion associated with each of said rollers, and devices for angularly adjusting each notched pressure roller with respect to its respective pinion.

9. In a machine of the character described, the combination with a supporting frame having a holder for a length of belt fastener means thereon and a parallel rack; of a carriage adapted to reciprocate lengthwise of said holder; three pressure rollers mounted on said carriage and progressively set with their peripheral surfaces adapted to successively engage the fastener means and set the same, the first two of said rollers having notched peripheries to receive the prongs of the fastener means; shafts fixed to each of said pressure rollers and each carrying a pinion cooperable with said rack; and means for angularly adjusting each notched roller with respect to its pinion.

10. In a machine of the character described, the combination with a frame; of holding means thereon for retaining belt fastener means having a plurality of uniformly spaced prongs therealong and within which prongs the end of a belt is adapted to be inserted; and a plurality of pressure-applying devices movable on said frame lengthwise of said holding means, certain of said devices having the pressure-applying surface provided with recesses uniformly spaced to correspond with the spacing of the prongs and adapted to receive the latter therewithin while being moved lengthwise of the holding means.

11. In a machine of the character described, the combination with a frame; of fixed holding means thereon for belt fastener means having uniformly spaced prongs therealong; a pressure-applying roller having recesses in its periphery uniformly spaced to correspond with the spacing of the prongs and within which recesses the prongs are adapted to be individually received as the roller moves lengthwise of said holding means; a carrier mounted on said frame to reciprocate parallel to said holding means and in which said roller is journaled; cooperable means on the roller journal and frame for positively effecting rotation of said roller in timed relation with respect to said holding means when said carrier is reciprocated; and additional pressure-applying means also engageable with the prongs of the belt fastener means after the latter have been engaged by said roller.

In witness that I claim the foregoing I have hereunto subscribed my name this 9th day of July, 1930.

GEORGE E. PURPLE.